(12) United States Patent
Kobayashi (10) Patent No.: US 10,374,499 B2
(45) Date of Patent: Aug. 6, 2019

(54) POWER GENERATOR

(71) Applicant: T. K Leverage Co., Ltd., Tokyo (JP)

(72) Inventor: Takaitsu Kobayashi, Chiba (JP)

(73) Assignee: T. K LEVERAGE CO., LTD., Tokyo (JP)

( * ) Notice: Subject to any disclaimer, the term of this patent is extended or adjusted under 35 U.S.C. 154(b) by 313 days.

(21) Appl. No.: 15/398,138

(22) Filed: Jan. 4, 2017

(65) Prior Publication Data

US 2017/0117785 A1    Apr. 27, 2017

Related U.S. Application Data

(62) Division of application No. 14/111,221, filed as application No. PCT/JP2012/059887 on Apr. 11, 2012, now Pat. No. 9,570,967.

(30) Foreign Application Priority Data

Apr. 19, 2011    (JP) .................................. 2011-93435

(51) Int. Cl.
*H02K 16/00*    (2006.01)
*H02K 16/02*    (2006.01)
(Continued)

(52) U.S. Cl.
CPC ............... *H02K 16/02* (2013.01); *H02K 1/17* (2013.01); *H02K 1/274* (2013.01); *H02K 1/278* (2013.01);
(Continued)

(58) Field of Classification Search
CPC ....... H02K 16/02; H02K 1/2786; H02K 1/274
(Continued)

(56) References Cited

U.S. PATENT DOCUMENTS 5,994,809 A    11/1999   Ackermann
6,121,705 A    9/2000    Hoong
(Continued)

FOREIGN PATENT DOCUMENTS

JP    6-54497    2/1994
JP    3709145    10/2005
(Continued)

OTHER PUBLICATIONS

International Search Report dated Jul. 10, 2012 in International (PCT) Application No. PCT/JP2012/059887.

*Primary Examiner* — Thanh Lam
(74) *Attorney, Agent, or Firm* — Wenderoth, Lind & Ponack, L.L.P.

(57) ABSTRACT

The present invention provides a power generator which can obtain efficient power generation by changing magnetic force acting on electromotive coils. The power generator is provided with a first permanent magnet member 1, a second permanent magnet member 2, and an electromotive coil member 3 arranged concentrically to have a telescoping structure and is configured so that power generation in the electromotive coil member 3 is induced by rotating the first permanent magnet member 1 or/and the second permanent magnet member 2. In the power generator, the first and second permanent magnet members 1 and 2 cooperate with each other to change the magnetic force and, thus, to obtain efficient power generation.

2 Claims, 9 Drawing Sheets

(51) Int. Cl.
*H02K 1/17* (2006.01)
*H02K 21/16* (2006.01)
*H02K 21/12* (2006.01)
*H02K 21/26* (2006.01)
*H02K 1/27* (2006.01)
*H02K 3/47* (2006.01)

(52) U.S. Cl.
CPC .............. *H02K 21/12* (2013.01); *H02K 21/16* (2013.01); *H02K 21/26* (2013.01); *H02K 3/47* (2013.01)

(58) Field of Classification Search
USPC .................................................. 310/114, 266
See application file for complete search history.

(56) References Cited

U.S. PATENT DOCUMENTS

| | | | | |
|---|---|---|---|---|
| 6,838,790 | B2 * | 1/2005 | Arimitsu | H02K 1/08 310/114 |
| 7,982,351 | B2 | 7/2011 | Atallah | |
| 8,339,010 | B2 | 12/2012 | Atarashi | |
| 8,466,592 | B2 * | 6/2013 | Atallah | H02K 11/048 310/103 |
| 2004/0232800 | A1 * | 11/2004 | Seguchi | F02N 11/04 310/266 |
| 2006/0175923 | A1 | 8/2006 | Abou Akar et al. | |
| 2008/0024034 | A1 * | 1/2008 | Koizumi | H02K 5/128 310/266 |
| 2009/0091204 | A1 * | 4/2009 | Koshiba | H02K 16/02 310/114 |
| 2010/0283345 | A1 | 11/2010 | Atallah et al. | |
| 2011/0210636 | A1 | 9/2011 | Kuhlmann-Wilsdorf | |
| 2012/0146442 | A1 * | 6/2012 | Atallah | H02K 11/048 310/114 |

FOREIGN PATENT DOCUMENTS

| | | |
|---|---|---|
| JP | 2006-520178 | 8/2006 |
| JP | 2007-259636 | 10/2007 |
| JP | 2008-193888 | 8/2008 |
| JP | 2009-535012 | 9/2009 |
| JP | 2009-268269 | 11/2009 |
| JP | 2010-17032 | 1/2010 |
| JP | 2010-533475 | 10/2010 |

* cited by examiner

POWER GENERATOR

TECHNICAL FIELD

The present invention relates to a power generator which induces power generation by relative rotation between a permanent magnet and an electromotive coil.

BACKGROUND ART

As well known, there have been developed various power generators which induce power generation. In those power generators, a permanent magnet member provided with permanent magnets arranged in the form of a tube and an electromotive coil member provided with electromotive coils arranged in the form of a tube are arranged concentrically. Namely, the single permanent magnet member and the single electromotive coil member are arranged concentrically. In this state, the single permanent magnet member is rotated to change magnetic force in the electromotive coil, and, thus, to induce power generation.

In the well-known power generator, since the magnetic force inducing power generation, that is, the magnetic force of the permanent magnet is constant, there has been employed the constitution as disclosed in Patent Document 1 in which an electromagnet is provided separately from the permanent magnet, and the magnetic force of the electromagnet is added or not added to increase or reduce the magnetic force.

PRIOR ART DOCUMENT

Patent Document

Patent Document 1: JP 3709145 B1

DISCLOSURE OF THE INVENTION

Problem to be Solved by the Invention

In other words, the power generator disclosed in the Patent Document 1 is based on the idea of fitting an electromagnet with a single permanent magnet member and changing the magnetic force acting on an electromotive coil by the electromagnet to obtain efficient power generation.

Means for Solving Problem

Compared with this, the power generator according to the present invention is provided with a first permanent magnet member and a second permanent magnet member which are arranged concentrically to have a telescoping structure, and the first and second permanent magnet members cooperate with each other to change the magnetic force acting on an electromotive coil, and, thus, to obtain efficient power generation.

Specifically, the power generator according to the present invention is provided with a first permanent magnet member, a second permanent magnet member, and an electromotive coil member which are arranged concentrically to have a telescoping structure and is configured so that power generation in the electromotive coil member is induced by rotating the first permanent magnet member or/and the second permanent magnet member. In the power generator, the first and second permanent magnet members cooperate with each other to change magnetic force, and, thus, to obtain efficient power generation.

As a specific example, one of the first permanent magnet member and the second permanent magnet member is positively rotated and the other is reversely rotated, and the rotation speeds of them are substantially increased, whereby the power generation efficiency can be improved.

The power generator is provided with a first permanent magnet member, a second permanent magnet member, and an electromotive coil member arranged concentrically to have a telescoping structure and is configured so that power generation in the electromotive coil member is induced by rotating the electromotive coil member. In the power generator, the first and second permanent magnet members cooperate with each other to change the magnetic force and, thus, to obtain efficient power generation.

As a specific example in which the first permanent magnet member or/and the second permanent magnet member is rotated, the electromotive coil member is disposed concentrically outward the first and second permanent magnet members, or the electromotive coil member in which electromotive coils constituted of air core coils are arranged is disposed concentrically between the first permanent magnet member and the second permanent magnet member.

As a specific example in which the electromotive coil member is rotated, the electromotive coil member in which the electromotive coils constituted of air core coils are arranged is disposed concentrically between the first permanent magnet member and the second permanent magnet member.

As a specific example, the first and second permanent magnet members are provided with a large number of permanent magnets with opposite polarities in the radial direction which are arranged in the circumferential direction, and the magnetic change with reliability is realized to obtain efficient power generation.

Further, the number of the permanent magnets of one of the first and second permanent magnet members is an integral multiple of the number of the permanent magnets of the other permanent magnet member, the permanent magnets of the one of the first and second permanent magnet members are arranged adjacent to each other so that their polarities are opposite to each other, and, at the same time, the permanent magnets of the other permanent magnet member are arranged adjacent to each other so that their polarities are opposite to each other, whereby the magnetic change is caused frequently to obtain efficient power generation.

Effects of Invention

According to the present invention, the magnetic force acting on the electromotive coil is changed by the cooperation between the first and second permanent magnet members, whereby efficient power generation can be obtained.

As a specific example, the first and second permanent magnet members are constituted of a large number of the permanent magnets with opposite polarities in the radial direction which are arranged in the circumferential direction. Consequently, the permanent magnet of the first permanent magnet member and the permanent magnet of the second permanent magnet member face each other in the radial direction, and the magnetic force is increased or reduced between the opposite polarities (N pole and S pole) of the facing permanent magnets and between the same polarities (S pole and S pole or N pole and N pole) of the facing permanent magnets, whereby the magnetic force can be changed.

Further, the number of the permanent magnets of one of the first and second permanent magnet members is an integral multiple of the number of the permanent magnets of the other permanent magnet member, and the permanent magnets of the one permanent magnet member are arranged adjacent to each other so that their polarities are opposite to each other. Consequently, the number of the permanent magnets of the first permanent magnet member and the permanent magnets of the second permanent magnet member with opposite polarities that face each other and the number of the permanent magnets of the first permanent magnet member and the permanent magnets of the second permanent magnet member with the same polarity that face each other are increased to make the magnetic change occur frequently, whereby efficient power generation can be obtained.

DESCRIPTION OF EMBODIMENTS

Hereinafter, best modes for carrying out the invention will be described based on FIGS. 1 to 9.

Figure 1:
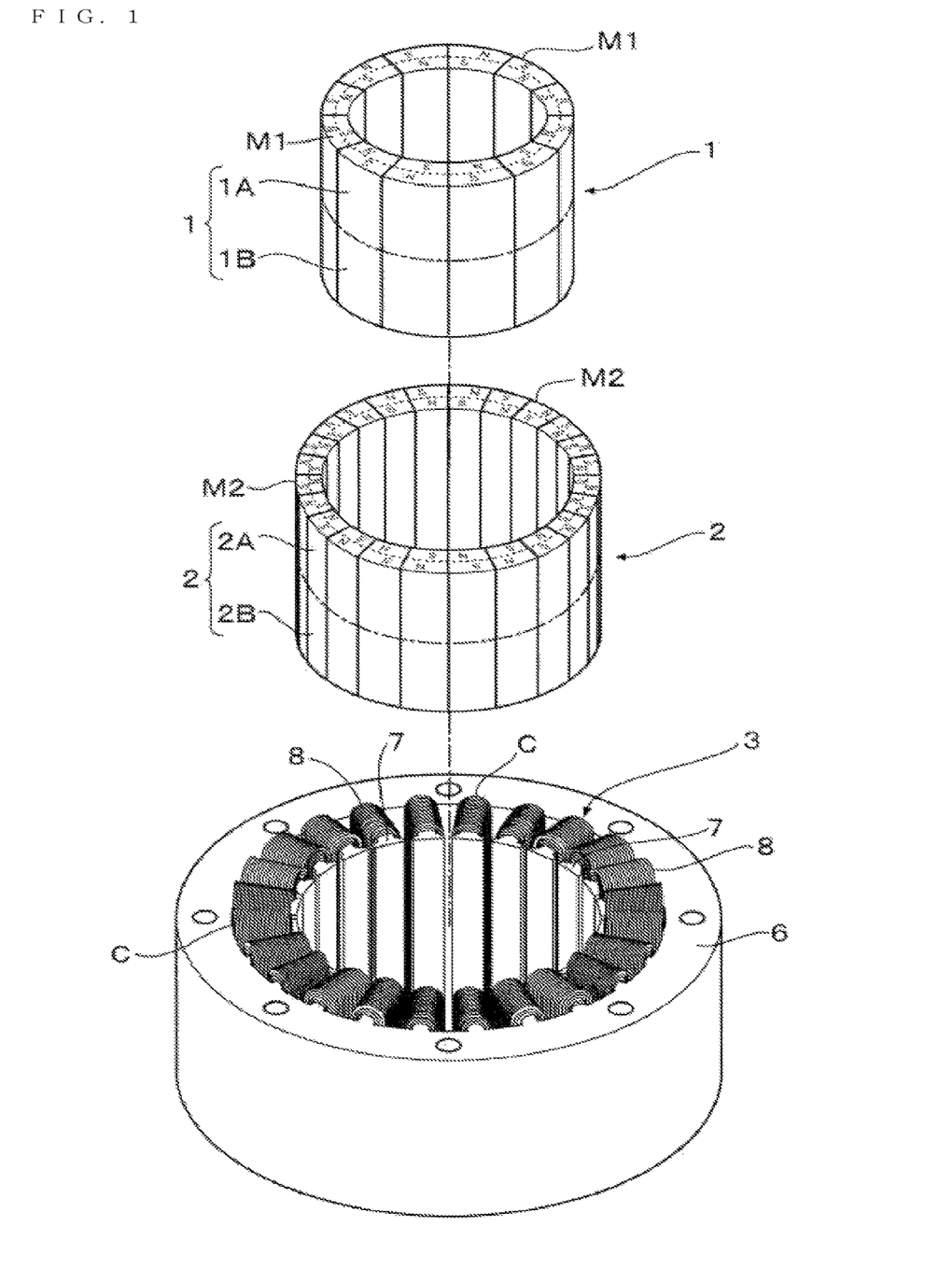
FIG. 1 is an exploded perspective view of a power generator according to an example 1 of the present invention.
Figure 5:
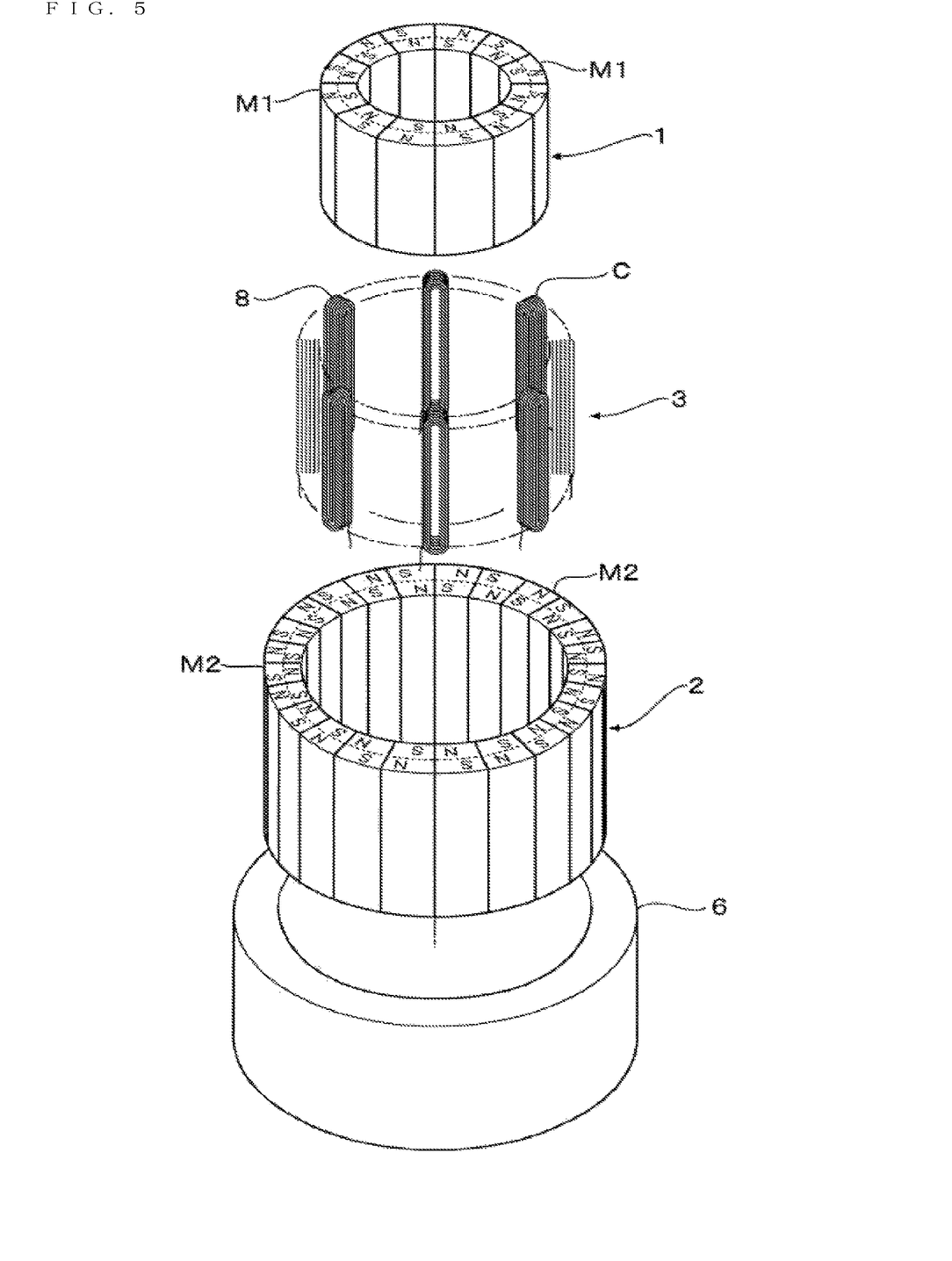
FIG. 5 is an exploded perspective view of a power generator according to examples 2 and 3 of the present invention.

As a basic configuration of a power generator according to the present invention, as shown in FIGS. 1 and 5, a first permanent magnet member 1 provided with permanent magnets M1 arranged in a tubular or annular form, a second permanent magnet member 2 provided with permanent magnets M2 arranged in a tubular or annular form, and an electromotive coil member 3 provided with electromotive coils C arranged in a tubular or annular form are arranged concentrically to have a telescoping structure. By virtue of relative rotation between the first permanent magnet member 1 or/and the second permanent magnet member 2 and the electromotive coil member 3, power generation in the electromotive coil member 3 is induced.

Figure 2:
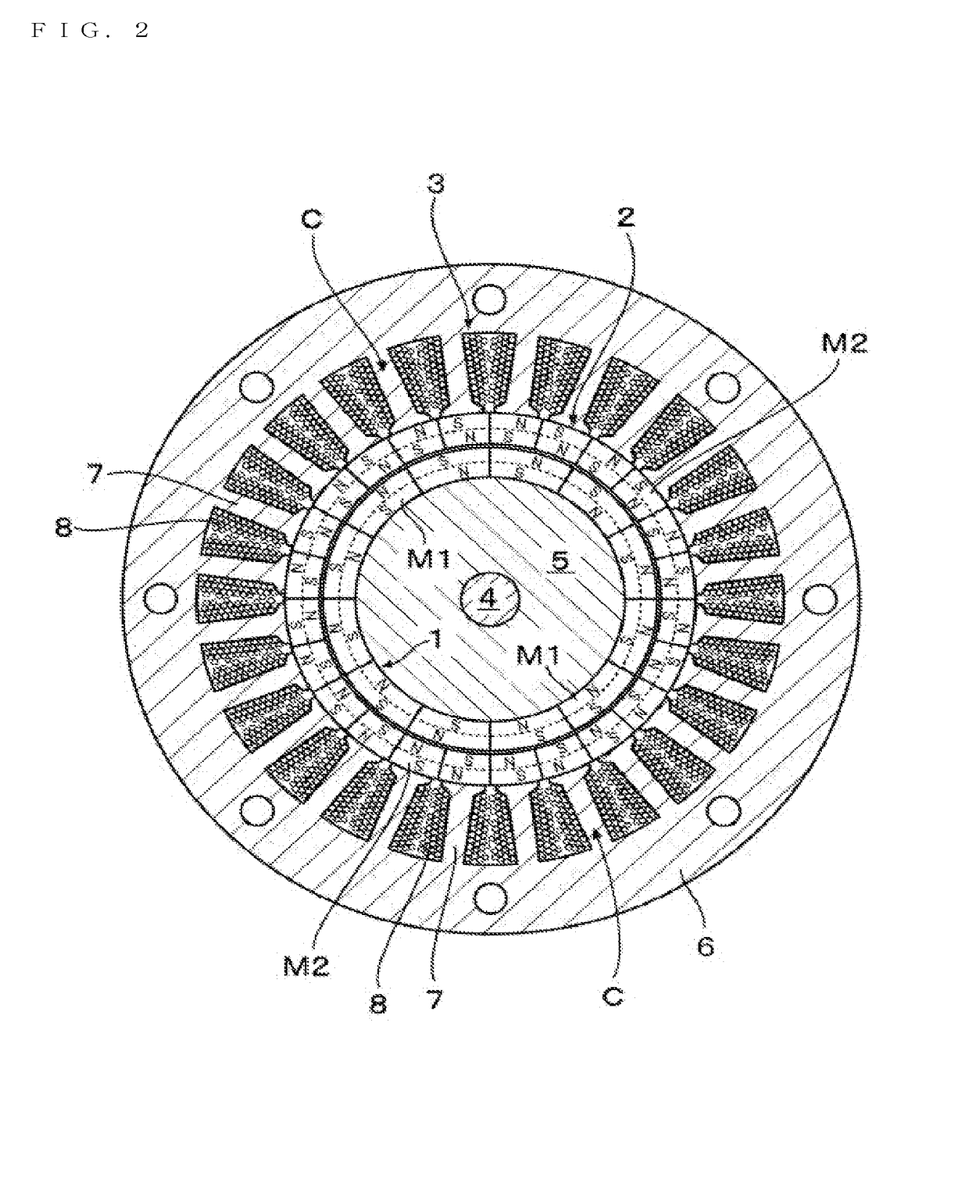
FIG. 2 is a horizontal cross-sectional view of the power generator according to the example 1.
Figure 6:
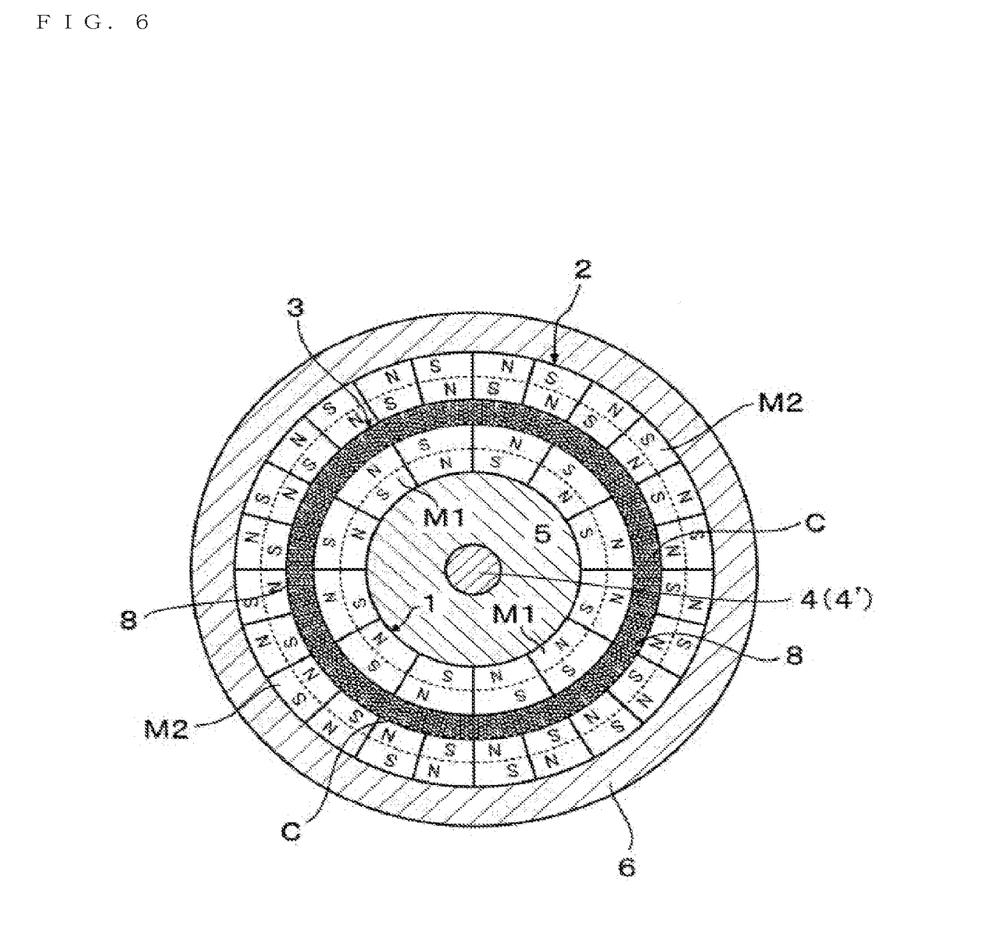
FIG. 6 is a horizontal cross-sectional view of the power generator according to the examples 2 and 3.

As a configuration common to examples 1 to 3, as shown in FIGS. 2 and 6, the first permanent magnet member 1 is constituted of a large number of permanent magnets M1 whose polarities are opposite to each other in the radial direction, that is, a large number of the permanent magnets M1 with opposite polarities on the outer peripheral surface and the inner peripheral surface which are arranged in the circumferential direction.

Similarly, the second permanent magnet member 2 is constituted of a large number of permanent magnets M2 whose polarities are opposite to each other in the radial direction, that is, a large number of the permanent magnets M2 with opposite polarities on the outer peripheral surface and the inner peripheral surface which are arranged in the circumferential direction.

The number of either of the permanent magnets M1 and the permanent magnets M2 is preferably an integral multiple of the number of the other permanent magnets. In the examples 1 to 3 to be described later, the number of the permanent magnets M2 is doubled the number of the permanent magnets M1.

As shown in FIGS. 2 and 6, a large number of the permanent magnets M1 are arranged adjacent to each other so that their polarities are opposite to each other. For example, the polarity of the outer peripheral surface of the permanent magnet M1 adjacent to the permanent magnet M1 whose polarity on the outer peripheral surface is N pole (the polarity on the inner peripheral surface is S pole) is S pole (the polarity on the inner peripheral surface is N pole).

Similarly, a large number of the permanent magnets M2 are arranged adjacent to each other so that their polarities are opposite to each other. For example, the polarity on the outer peripheral surface of the permanent magnet M2 adjacent to the permanent magnet M2 whose polarity on the outer peripheral surface is N pole (the polarity on the inner peripheral surface is S pole) is S pole (the polarity of the inner peripheral surface is N pole).

In the formation of the first permanent magnet member 1, the permanent magnets M1 constituted of magnetic shells having a circular-arc cross section are assembled in a tubular or annular form. Alternatively, the permanent magnets M1 magnetizes a tubular or rod-like magnetic body so as to have the above polarity arrangement, whereby the first permanent magnet member 1 is formed. The magnetizing is performed in a straight form along a central axis direction of the magnetic body or is performed on a skew with an inclination angle in a coaxial direction.

Further, in the present invention, the permanent magnets M1 may be buried in a peripheral surface of a rotation shaft 4 or a fixing shaft 4' to be described later, and be arranged in a tubular or annular form, thereby forming the first permanent magnet member 1.

In the formation of the second permanent magnet member 2, the permanent magnets M2 constituted of magnetic shells having a circular-arc cross section are assembled in a tubular or annular form. Alternatively, the permanent magnets M2 magnetizes a tubular magnetic body so as to have the above polarity arrangement, whereby the second permanent magnet member 2 is formed. The magnetizing is also performed in a straight form along a central axial direction of the magnetic body or is performed on a skew with an inclination angle in a coaxial direction. The second permanent magnet member 2 has a larger diameter than the first permanent magnet member 1 and is disposed concentrically outward the first permanent magnet member 1.

As shown by dashed lines in FIG. 1, the present invention includes a case where the first permanent magnet member 1 has stages 1A and 1B and the second permanent magnet member 2 has stages 2A and 2B, as well as a case where each segment (1A and 1B or 2A and 2B) is a single member.

The electromotive coil member 3 is constituted of a large number of electromotive coils C arranged in the circumferential direction and is arranged concentrically with the first and second permanent magnet members 1 and 2. For example, the electromotive coil member 3 is disposed concentrically outward the first and second permanent magnet members 1 and 2 as shown in the example 1 to be described later, or the electromotive coil member 3 is disposed concentrically between the first permanent magnet member 1 and the second permanent magnet member 2 as shown in the examples 2 and 3 to be described later.

Figure 4:
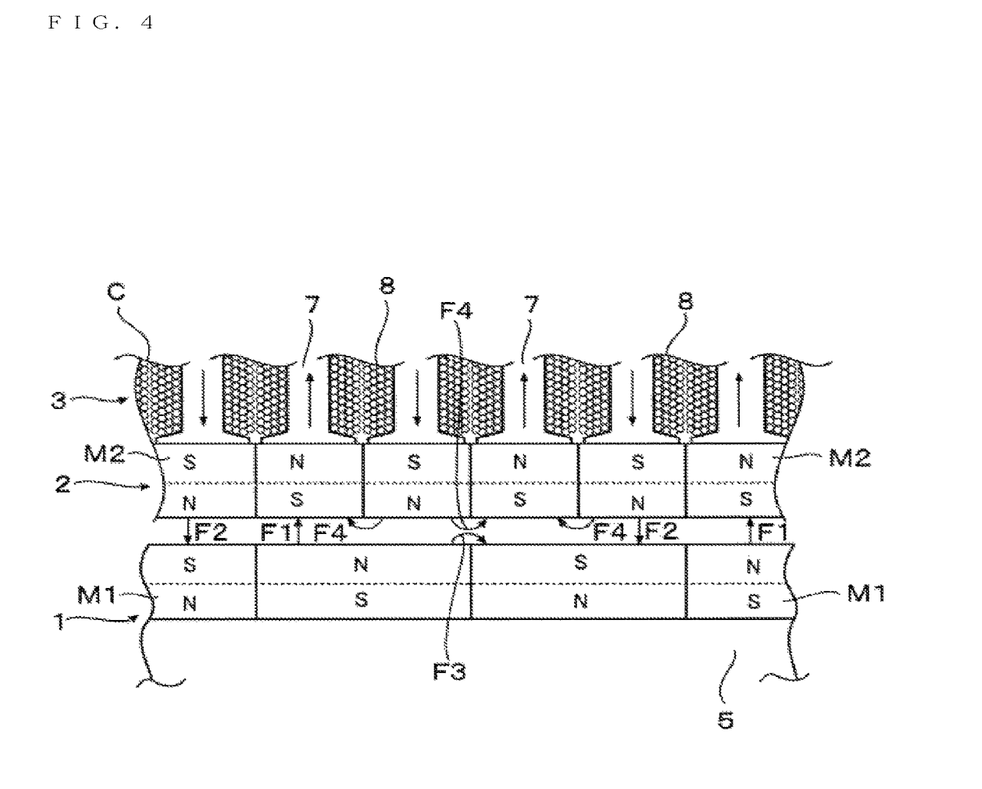
FIG. 4 is an enlarged view of a relevant portion, showing in cross-sectional view magnetic force directions in permanent magnets of a first permanent magnet member, permanent magnets of a second permanent magnet member, and a core.
Figure 9:
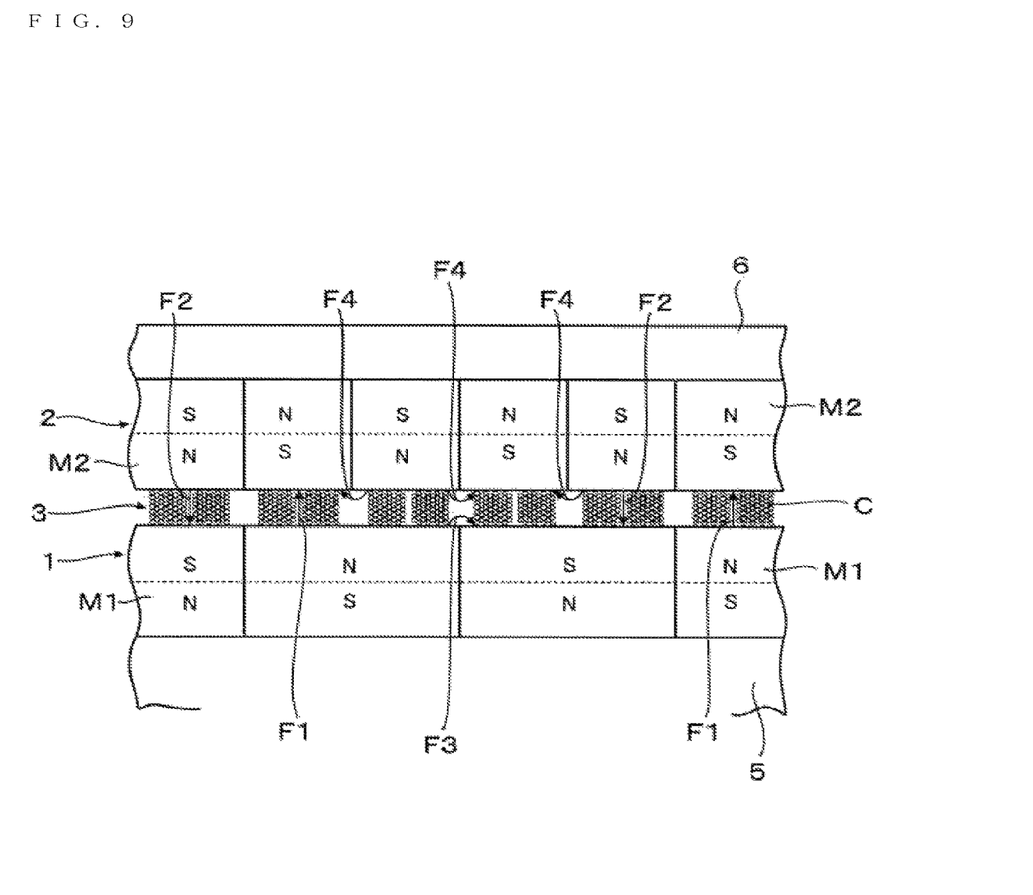
FIG. 9 is an enlarged view of a relevant portion, showing in cross-sectional view the magnetic force directions between permanent magnets of a first permanent magnet member and permanent magnets of a second permanent magnet member in the examples 2 and 3.

In the power generator according to the present invention, as shown in FIGS. 4 and 9, the first permanent magnet member 1 and the second permanent magnet member 2 cooperate with each other to change the magnetic force, whereby efficient power generation can be induced.

Namely, when the polarity of the outer peripheral surface of the permanent magnet M1 of the first permanent magnet member 1 is opposite to the polarity of the inner peripheral surface of the permanent magnet M2 of the second permanent magnet member 2 facing the permanent magnet M1 in the radial direction, strong stable magnetic force is generated between them.

For example, when the polarity of the outer peripheral surface of the permanent magnet M1 is N pole, and the polarity of the inner peripheral surface of the permanent magnet M2 is S pole, as shown by F1 in the drawing, stable magnetic force flowing from the permanent magnet M1 to the permanent magnet M2 is generated. Meanwhile, when the polarity of the outer peripheral surface of the permanent magnet M1 is S pole, and the polarity of the inner peripheral surface of the permanent magnet M2 is N pole, as shown by F2 in the drawing, stable magnetic force flowing from the permanent magnet M2 to the permanent magnet M1 is generated.

When the polarity of the outer peripheral surface of the permanent magnet M1 of the first permanent magnet member 1 is the same as the polarity of the inner peripheral surface of the permanent magnet M2 of the second permanent magnet member 2 facing the permanent magnet M1 in the radial direction, the magnetic force flowing between them is not generated and the magnetic forces in directions shown by F3 and F4 in the drawing are generated.

Namely, as shown by F3 in the drawing, the magnetic force flowing from the outer peripheral surface of the N pole of the permanent magnet M1 to the outer peripheral surface of the S pole of the adjacent permanent magnet M1 is generated. Moreover, as shown by F4, the magnetic force flowing from the outer peripheral surface of the N pole of the permanent magnet M2 to the outer peripheral surface of the S pole of the adjacent permanent magnet M2 is generated.

By virtue of the relative rotation between the first permanent magnet member 1 or/and the second permanent magnet member 2 and the electromotive coil member 3, the magnetic forces in the directions shown by F1 to F4 in the drawing are replaced and act on the electromotive coils C, whereby efficient power generation can be obtained.

In the first and second permanent magnet members 1 and 2 according to the present invention, the thickness, the magnetic force, and the number of the permanent magnets M1 and M2 can be set freely, so that the magnetic force change can be improved.

Although the permanent magnets M1 and M2 of the first and second permanent magnet members 1 and 2 are arranged adjacent to each other in a tubular form as shown in the drawing, they may be arranged at a distance in the circumferential direction.

EXAMPLE 1

In the example 1, as shown in FIGS. 1 to 4, a first tubular yoke 5 is fitted onto a rotation shaft 4 rotated by a power source 9 such as a motor, a turbine, and an engine, and the first permanent magnet member 1 is fitted onto the first tubular yoke 5.

Figure 3:
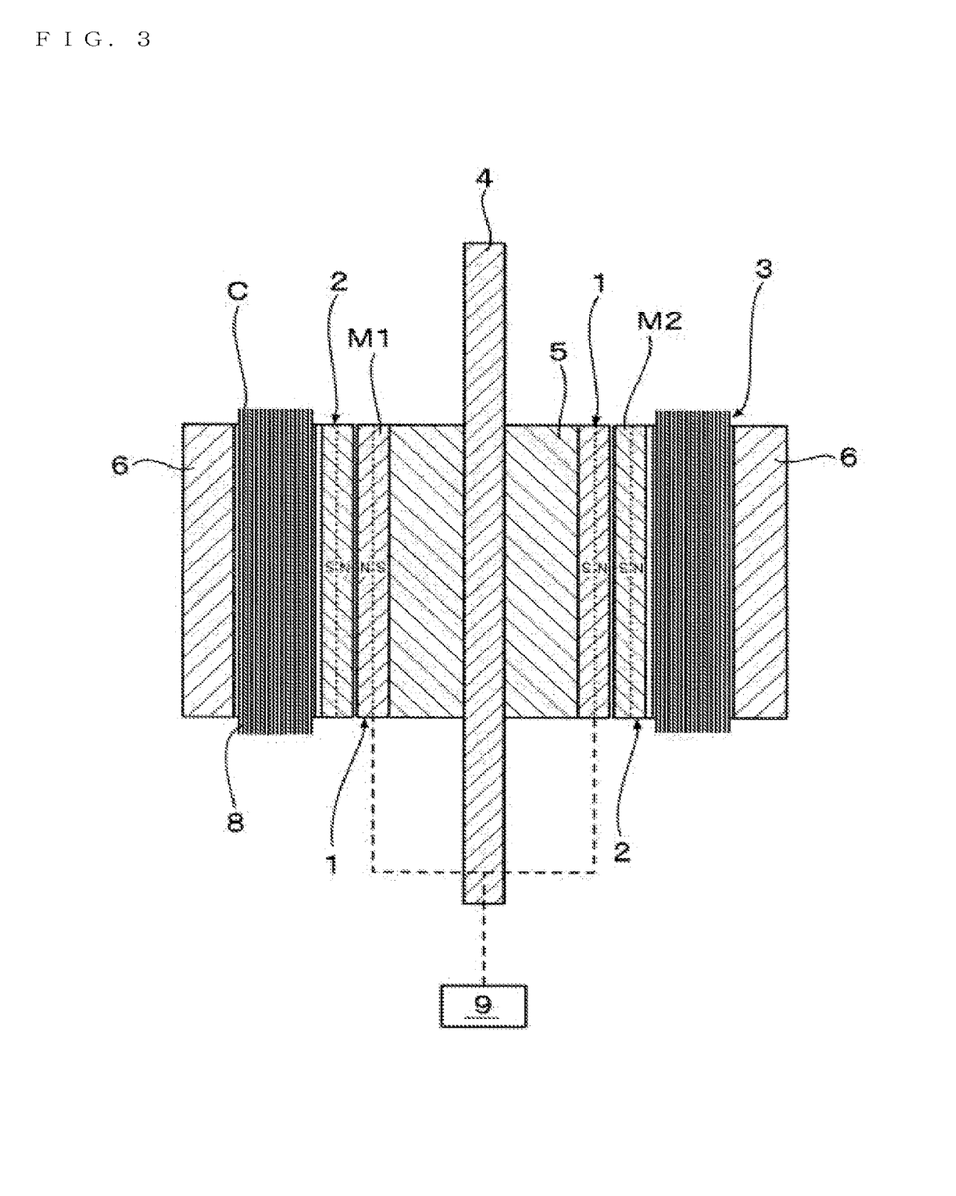
FIG. 3 is a longitudinal cross-sectional view of the power generator according to the example 1.

The second permanent magnet member 2 is disposed concentrically at a distance in the radial direction from the first permanent magnet member 1. The electromotive coil member 3 is fitted onto the second permanent magnet member 2, and a second tubular yoke 6 is fitter onto the electromotive coil member 3.

Accordingly, in this example, the first permanent magnet member 1, the second permanent magnet member 2, and the electromotive coil member 3 arranged concentrically to have a telescoping structure are provided. The first permanent magnet member 1 is rotated to fix the second permanent magnet member 2 and the electromotive coil member 3, and the first permanent magnet member 1, the second permanent magnet member 2, and the electromotive coil member 3 are relatively rotated. The power generation in the electromotive coil member 3 is induced by the relative rotation.

As shown in FIG. 2, the electromotive coil C of the electromotive coil member 3 is formed by winding winding wires 8 around a plurality of cores 7 arranged on the inner peripheral surface of the second tubular yoke 6 at a distance in the circumferential direction. Each of the cores 7 is formed by stacking silicon steel plates and adhered to the outer peripheral surface of each of the permanent magnets M2 of the second permanent magnet member 2.

The number of the permanent magnets M2 of the second permanent magnet member 2 is doubled the number of the permanent magnets M1 of the first permanent magnet member 1, and the permanent magnets M1 and M2 are faced in the radial direction. Namely, the outer peripheral surface of the one permanent magnet M1 faces the inner peripheral surfaces of the two permanent magnets M2.

As described above, since the permanent magnets M2 are arranged adjacent to each other so that their polarities are opposite to each other, the permanent magnet M2 having the inner peripheral surface of the same polarity (for example, N pole) as the polarity (N pole) of the outer peripheral surface of the permanent magnet M1 and the permanent magnet M2 having the inner peripheral surface of the opposite polarity (S pole) face the outer peripheral surface of the one permanent magnet M1, so that the magnetic force change to be described later occurs frequently, whereby efficient power generation can be obtained.

To describe in detail, as shown in FIG. 4, when the polarity of the outer peripheral surface of the permanent magnet M1 is opposite to the polarity of the inner peripheral surface of the permanent magnet M2 facing the permanent magnet M1, strong stable magnetic force is generated between them in a direction shown by F1 or F2.

Accordingly, the first permanent magnet member 1 rotates to rotate each of the permanent magnets M1, whereby the magnetic force in the direction shown by F1 and the magnetic force in the direction shown by F2 alternately act on the electromotive coil C through the core 7 adhered to the outer peripheral surface of each of the permanent magnets M2 to change the magnetic force in the electromotive coil C, and, thus, to induce efficient power generation.

As shown in FIG. 4, when the polarity of the outer peripheral surface of the permanent magnet M1 is the same as the polarity of the inner peripheral surface of the permanent magnet M2 facing the permanent magnet M1, the magnetic force does not flow between them, and the magnetic force is generated in the directions shown by F3 and F4 in the drawing. A portion of the magnetic force in the direction shown by F4 is added to the magnetic force in the direction shown by F1, whereby the magnetic force change is compensated.

It is preferable that the facing interval between the permanent magnet M1 of the first permanent magnet member 1 and the permanent magnet M2 of the second permanent magnet member 2 is reduced as far as possible to flow the magnetic force effectively.

EXAMPLE 2

In the example 2, as shown in FIGS. 5 to 7 and 9, a first tubular yoke 5 is fitted onto a fixing shaft 4', and the first permanent magnet member 1 is fitted onto the first tubular yoke 5.

Figure 7:
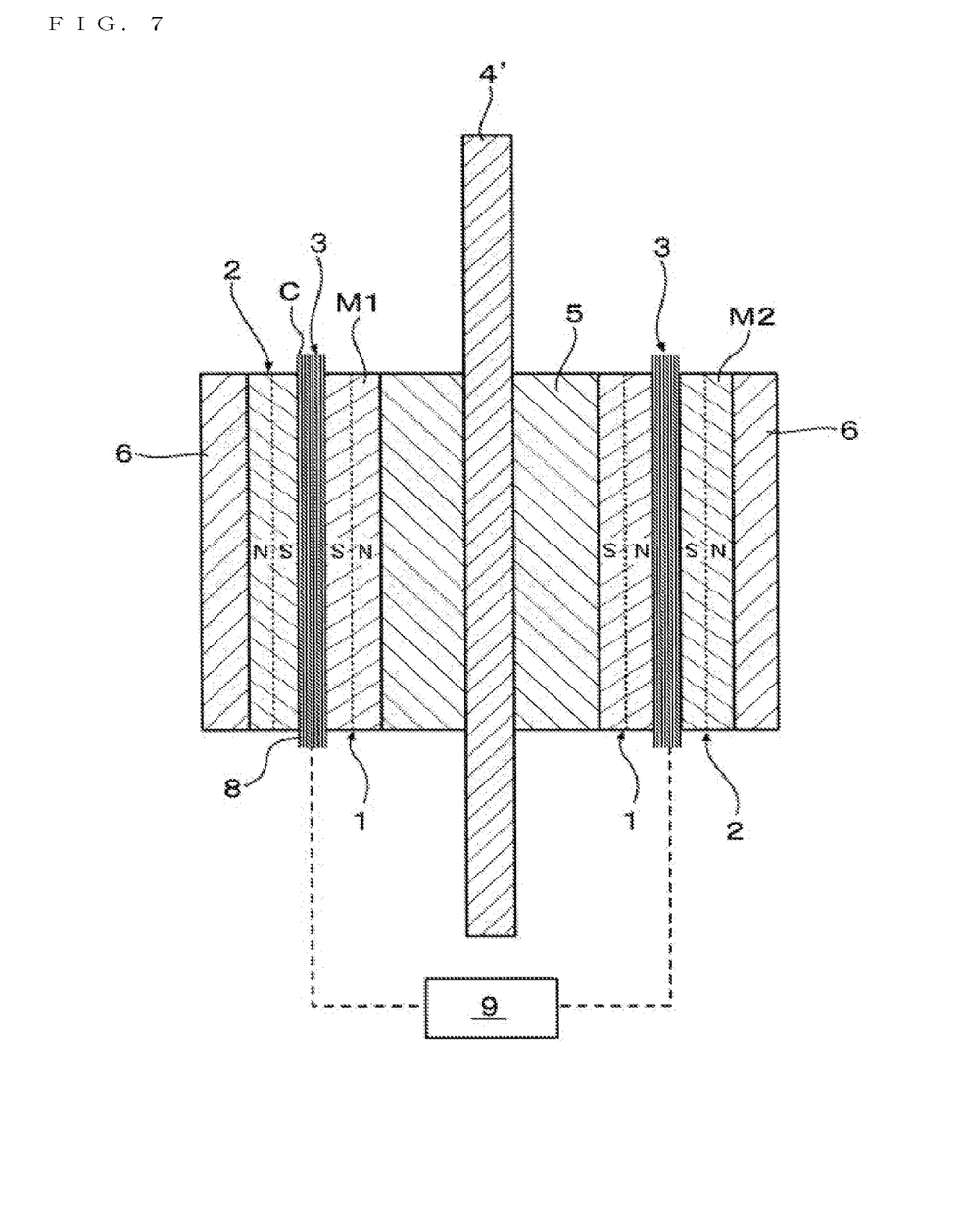
FIG. 7 is a longitudinal cross-sectional view of the power generator according to the example 2.

The electromotive coil member 3 is rotatably disposed coaxially at a distance in the radial direction from the first permanent magnet member 1, and the second permanent magnet member 2 is fixed and coaxially disposed at a distance in the radial direction from the electromotive coil member 3. A second tubular yoke 6 is fitted onto the second permanent magnet member 2. The electromotive coil member 3 is rotated by a power source 9 such as a motor, a turbine, and an engine.

Accordingly, in this example, the first permanent magnet member 1, the second permanent magnet member 2, and the electromotive coil member 3 arranged concentrically to have a telescoping structure are provided. The electromotive coil member 3 is rotated to fix the first and second permanent magnet members 1 and 2, and the electromotive coil member 3 and the first and second permanent magnet members 1 and 2 are relatively rotated. The power generation in the electromotive coil member 3 is induced by the relative rotation.

As shown in FIGS. 5 and 6, the electromotive coil member 3 is coreless and is provided with an electromotive coil C constituted of an air core coil around which a winding wire 8 is wound in a tubular or annular form, and the electromotive coils C are connected in a tubular or annular form to form the electromotive coil member 3. Alternatively, each of the electromotive coils C constituted of the air core coil is held from the inside and the outside between two tubular bodies constituted of a nonmagnetic body such as glass to form the electromotive coil member 3.

In this example, as in the example 1, the electromotive coil C may be a core coil.

The number of the permanent magnets M2 of the second permanent magnet member 2 is doubled the number of the permanent magnets M1 of the first permanent magnet member 1, and the permanent magnets M1 and M2 are faced in the radial direction. Namely, the outer peripheral surface of the one permanent magnet M1 and the inner peripheral surfaces of the two permanent magnets M2 are faced each other, and the electromotive coil C is interposed in the facing interval.

As described above, since the permanent magnets M2 are arranged adjacent to each other to have the polarities be opposite to each other, the permanent magnet M2 having the inner peripheral surface of the same polarity (for example, N pole) as the polarity (N pole) of the outer peripheral surface of the permanent magnet M1 and the permanent magnet M2 having the inner peripheral surface of the opposite polarity (S pole) face the outer peripheral surface of the one permanent magnet M1, so that the magnetic change to be described later occurs frequently, whereby efficient power generation can be achieved.

To describe in detail, as shown in FIG. 9, when the polarity of the outer peripheral surface of the permanent magnet M1 is opposite to the polarity of the inner peripheral surface of the permanent magnet M2 facing the permanent magnet M1, strong stable magnetic force is generated between them in a direction shown by F1 or F2 in the drawing.

As shown in FIG. 9, when the polarity of the outer peripheral surface of the permanent magnet M1 is the same as the polarity of the inner peripheral surface of the permanent magnet M2, the magnetic force does not flow between them, and the magnetic forces are generated in the directions shown by F3 and F4 in the drawing.

In this example, the magnetic forces in the directions shown by F1 to F4 in FIG. 9 are directly acted on the inside of the electromotive coil C to induce efficient power generation.

Specifically, the electromotive coil member 3 rotates between the permanent magnet M1 of the first permanent magnet member 1 and the permanent magnet M2 of the second permanent magnet member 2, and the magnetic force changes in the directions shown by F1 to F4 in FIG. 9, whereby efficient power generation is induced.

In this example, the electromotive coil C is interposed in the facing interval between the permanent magnet M1 and the permanent magnet M2, so that the facing interval increases. Therefore, it is desirable to efficiently utilize the magnetic forces derived from the permanent magnets M1 and M2 either by increasing to some extent the magnetic forces derived from the permanent magnets M1 and M2 or by using under cryogenic conditions near absolute zero at which a superconducting phenomenon occurs.

EXAMPLE 3

In the example 3, as shown in FIGS. 5, 6, 8, and 9, a first tubule yoke 5 is fitted onto a rotation shaft 4 rotated by a power source 9 such as a motor, a turbine, and an engine, and the first permanent magnet member 1 is fitted onto the first tubule yoke 5.

Figure 8:
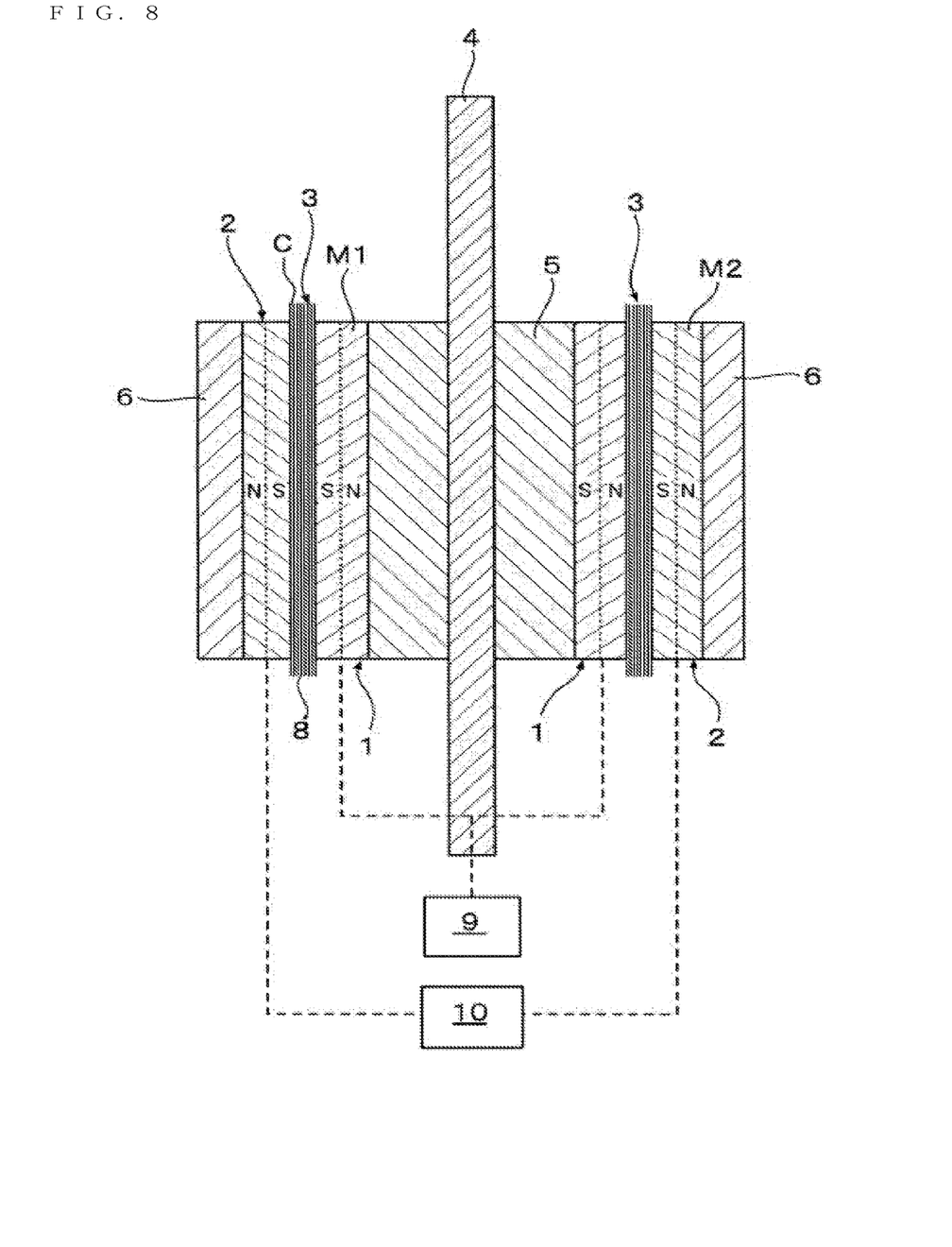
FIG. 8 is a longitudinal cross-sectional view of the power generator according to the example 3.

The electromotive coil member 3 is fixed and concentrically disposed at a distance in the radial direction from the first permanent magnet member 1, the second permanent magnet member 2 is rotatably disposed concentrically at a distance in the radial direction from the electromotive coil member 3, and a second tubular yoke 6 is fitted onto the second permanent magnet member 2. The second permanent magnet member 2 is rotated by a power source 10 such as a motor, a turbine, and an engine. The power source 9 and the power source 10 may be the same power source.

Accordingly, in this example, the first permanent magnet member 1, the second permanent magnet member 2, and the electromotive coil member 3 arranged concentrically to have a telescoping structure are provided. The electromotive coil member 3 is fixed to rotate the first and second permanent magnet members 1 and 2, and the electromotive coil member 3 and the first and second permanent magnet members 1 and 2 are relatively rotated. The power generation in the electromotive coil member 3 is induced by the relative rotation.

As shown in FIGS. 5 and 6, the electromotive coil member 3 is coreless and is provided with an electromotive coil C constituted of an air core coil around which a winding wire 8 is wound in a tubular or annular form, and the electromotive coils C are connected in a tubular or annular form to form the electromotive coil member 3. Alternatively, each of the electromotive coils C constituted of the air core coil is held from the inside and the outside between two tubular bodies constituted of a nonmagnetic body such as glass to form the electromotive coil member 3.

In this example, as in the example 1, the electromotive coil C may be a core coil.

The number of the permanent magnets M2 of the second permanent magnet member 2 is doubled the number of the permanent magnets M1 of the first permanent magnet member 1, and the permanent magnets M1 and M2 are faced in the radial direction. Namely, the outer peripheral surface of the one permanent magnet M1 and the inner peripheral surfaces of the two permanent magnets M2 are faced each other, and the electromotive coil C is interposed in the facing interval.

As described above, since the permanent magnets M2 are arranged adjacent to each other so that their polarities are opposite to each other, the permanent magnet M2 having the inner peripheral surfaces of the same polarity (for example, N pole) as the polarity (N pole) of the outer peripheral surface of the permanent magnet M1 and the permanent magnet M2 having the inner peripheral surface of the opposite polarity (S pole) face the outer peripheral surface of the one permanent magnet M1, so that the magnetic change to be described later occurs frequently, whereby efficient power generation can be achieved.

To describe in detail, as shown in FIG. 9, when the polarity of the outer peripheral surface of the permanent magnet M1 is opposite to the polarity of the inner peripheral surface of the permanent magnet M2 facing the permanent magnet M1, strong stable magnetic force is generated between them in a direction shown by F1 or F2 in the drawing.

As shown in FIG. 9, when the polarity of the outer peripheral surface of the permanent magnet M1 is the same as the polarity of the inner peripheral surface of the permanent magnet M2 facing the permanent magnet M1, the magnetic force does not flow between them, and the magnetic forces are generated in the directions shown by F3 and F4 in the drawing.

In this example, the magnetic forces in the directions shown by F1 to F4 in FIG. 9 are directly acted on the inside of the electromotive coil C to induce efficient power generation.

Specifically, the first permanent magnet member 1 and the second permanent magnet member 2 rotate while holding the electromotive coil member 3 between them, and the magnetic force changes in the directions shown by F1 to F4 in FIG. 9 in each of the electromotive coils C between the permanent magnet M1 and the permanent magnet M2, whereby efficient power generation is induced.

In this example, the first and second permanent magnet members 1 and 2 may be rotated at the same speed in the same direction, or one permanent magnet member and the other permanent magnet member may be rotated at different speeds in the same direction.

Alternatively, one of the first and second permanent magnet members 1 and 2 is positively rotated and the other is reversely rotated, and their rotation speeds are substantially increased, whereby the power generation efficiency can be improved.

In this example, the electromotive coil C is interposed in the facing interval between the permanent magnets M1 and M2, so that the facing interval increases. Therefore, it is desirable to efficiently utilize the magnetic forces derived from the permanent magnets M1 and M2 either by increasing to some extent the magnetic forces derived from the permanent magnets M1 and M2 or by using under cryogenic conditions near absolute zero at which a superconducting phenomenon occurs.

The power generator according to the present invention is not limited to the above examples, and the present invention includes all the cases where the power generation in the electromotive coil member 3 is induced by the relative rotation between the first permanent magnet member 1 or the second permanent magnet member 2 and the electromotive coil member 3.

In other words, the present invention includes all the cases where one of the first and second permanent magnet members 1 and 2 is rotated and the other permanent magnet member and the electromotive coil member 3 are fixed to perform the relative rotation, or one of the first and second permanent magnet members 1 and 2 is fixed and the other permanent magnet member and the electromotive coil member 3 are rotated to perform the relative rotation, whereby the power generation in the electromotive coil member 3 is induced.

In the power generator according to the present invention, all the cases where the power generation in the electromotive coil member 3 is induced by the relative rotation between the first and second permanent magnet members 1 and 2 and the electromotive coil member 3 are included.

In other words, the present invention includes all the cases where the first and second permanent magnet members 1 and 2 are rotated and the electromotive coil member 3 is fixed to perform the relative rotation, or the first and second permanent magnet members 1 and 2 are fixed and the electromotive coil member 3 is rotated to perform the relative rotation, whereby the power generation in the electromotive coil member 3 is induced.

DESCRIPTION OF THE REFERENCE NUMERALS

1 . . . First permanent magnet member, 2 . . . Second permanent magnet member, 3 . . . Electromotive coil member, 4 . . . Rotation shaft, 4' . . . Fixing shaft, 5 . . . First tubule yoke, 6 . . . Second tubular yoke, 7 . . . Core, 8 . . . Winding wire, 9 . . . Power source, 10 . . . Power source, M1 . . . Permanent magnet of first permanent magnet member, M2 . . . Permanent magnet of second permanent magnet member, C . . . Electromotive coil, F1, F2, F3, and F4 . . . Magnetic force direction

The invention claimed is:

1. A power generator comprising:
a first permanent magnet member;
a second permanent magnet member; and
an electromotive coil member arranged concentrically to have a telescoping structure, wherein
power generation in the electromotive coil member is induced by rotating the electromotive coil member,
the first and second permanent magnet members each comprise a plurality of permanent magnets with opposite polarities in a radial direction which are arranged in a circumferential direction,
a number of the permanent magnets of one of the first and second permanent magnet members is more than two times of an integral multiple of a number of the permanent magnets of another of the first and second permanent magnet members,
the permanent magnets of the one of the first and second permanent magnet members are arranged adjacent to each other such that adjacent pairs of the permanent magnets of the one of the first and second permanent magnet members have opposite polarities, the permanent magnets of the other of the first and second permanent magnet members are arranged adjacent to each other such that adjacent pairs of the permanent magnets of the other of the first and second permanent magnet members have opposite polarities, the electromotive coil member comprises a plurality of electromotive coils arranged in the circumferential direction, a number of the electromotive coils is the same as the number of the permanent magnets of the one of the first and second permanent magnet members, and the electromotive coils are arranged to respectively corresponding to the permanent magnets of the one of the first and second permanent magnet members.

2. The power generator according to claim 1, wherein the electromotive coils are air core coils, and the electromotive coil member is disposed concentrically between the first permanent magnet member and the second permanent magnet member.

* * * * *